US009129035B2

(12) United States Patent
Merritt

(10) Patent No.: US 9,129,035 B2
(45) Date of Patent: Sep. 8, 2015

(54) SYSTEMS, METHODS, AND APPARATUS FOR ACCESSING OBJECT REPRESENTATIONS OF DATA SETS

(75) Inventor: Norris Merritt, Del Mar, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1140 days.

(21) Appl. No.: 12/898,530

(22) Filed: Oct. 5, 2010

(65) Prior Publication Data

US 2012/0084306 A1 Apr. 5, 2012

(51) Int. Cl.
*G06F 17/30* (2006.01)

(52) U.S. Cl.
CPC ................................ *G06F 17/30917* (2013.01)

(58) Field of Classification Search
USPC .................. 707/706, 755, 756, 802, 803, 812
See application file for complete search history.

(56) References Cited

U.S. PATENT DOCUMENTS

2003/0023584 A1* 1/2003 Brandin ............................ 707/3
2005/0138052 A1* 6/2005 Zhou et al. .................... 707/101
2005/0216508 A1* 9/2005 Maria Meijer et al. .... 707/104.1
2006/0026189 A1 2/2006 Djugash
2006/0173865 A1 8/2006 Fong
2006/0294112 A1* 12/2006 Mandato et al. .............. 707/100
2007/0143342 A1 6/2007 Vannostrand
2008/0005093 A1* 1/2008 Liu et al. ............................ 707/4
2008/0282162 A1* 11/2008 Lincke et al. ................. 715/710

OTHER PUBLICATIONS

Davis, Leah. “X-Databases—The Integration of XML into Enterprise Database Management Systems” (Master’s Paper). School of Information and Library Science, University of North Carolina at Chapel Hill. Oct. 2000. 65 pages.

Beauchemin, Bob. “XML and Data Integration” [online]. Apr. 25, 2002 [retrieved on Apr. 4, 2011]. Retrieved from the Internet:<http://aspalliance.com/chapters/chapters/0201758660/Beauchemin7.PDF>. 78 pages.

* cited by examiner

*Primary Examiner* — Hosain Alam
*Assistant Examiner* — Reza Hosseini
(74) *Attorney, Agent, or Firm* — Hewlett-Packard Patent Department

(57) ABSTRACT

In one embodiment, markup representation of a data set is requested at a relational data store. The data set has a first portion stored at a first table structure of the relational data store and a second portion stored at a second tale structure of the relational data store. The markup representation of the data set is received from the relational data store and an object representation of the data set is generated based on the markup representation of the data set. The object representation of the data set includes a first element having a value of the first portion and a second element having a value of the second portion.

20 Claims, 14 Drawing Sheets

1100

```
<sql id="getPurchaseOrderXML">

select xmlelement (
  "P", xmlforest (
     o.order_id as "P1", o.order_date as "O1", o.order_mode as "O2",
     o.order_status as "O3", o.order_total as "O4"
  ),
  (  select xmlelement (
     "C", xmlforest (
       c.customer_id as "C1", c.cust_first_name as "C2",
       c.cust_last_name as "C3", c.cust_email as "C4"),
     (  select xmlelement ( "AS", xmlagg (
          xmlelement ( "A", xmlforest ( ca.address_type as "A0",
                       ca.cust_address.street_address as "A1",
                       ca.cust_address.city as "A2",
                       ca.cust_address.state_province as "A3",
                       ca.cust_address.postal_code as "A4",
                       ca.cust_address.country_id as "A5" ))))
       from customer_addresses ca where ca.customer_id = o.customer_id ))
    from customers c where c.customer_id = o.customer_id
  ),
  (  select xmlelement ( "OI", xmlagg ( xmlelement ( "I", ois.instruction_text )))
      from order_instructions ois
    where order_id = o.order_id
  ),
  (  select xmlelement ( "OS", xmlagg ( xmlelement (  "O", xmlforest (
                         oi.line_item_id as "OL1",
                         oi.unit_price as "OL2",
                         oi.quantity  as "OL3"),
                       (  select xmlelement (
                          "P", xmlforest (
                            p.product_id as "P1",
                            p.product_name as "P2",
                            p.product_description as "P3" ))
                             from product_information p
                             where p.product_id = oi.product_id ))
                      order by oi.line_item_id ))
    from order_items oi where oi.order_id = o.order_id
  )
).getClobVal()

from orders o where o.order_id = #value#

</sql>
```

```
<?xml version="1.0" encoding="UTF-8"?>
<P>
  <P1>2458</P1>
  <O1>1999-08-16T13:34:12.234359-07:00</O1>
  <O2>direct</O2>
  <O3>0</O3>
  <O4>78369.51</O4>
  <C>
    <C1>101</C1>
    <C2>Constantin</C2>
    <C3>Welles</C3>
    <C4>Constantin.Welles@ANHINGA.COM</C4>
    <AS>
      <A>
        <A0>Ship To</A0>
        <A1>514 W Superior St</A1>
        <A2>Kokomo</A2>
        <A3>IN</A3>
        <A4>46901</A4>
        <A5>US</A5>
      </A>
      <A>
        <A0>Bill To</A0>
        <A1>514 W Superior St</A1>
        <A2>Kokomo</A2>
        <A3>IN</A3>
        <A4>46901</A4>
        <A5>US</A5>
      </A>
    </AS>
  </C>
  <OI>
    <I>This is instruction line 1</I>
    <I>This is instruction line 2</I>
    <I>This is instruction line 3</I>
  </OI>
  <OS>
    <O>
      <OL1>1</OL1>
      <OL2>38</OL2>
      <OL3>140</OL3>
      <P>
        <P1>3117</P1>
        <P2>Mouse C/E</P2>
        <P3>Ergonomic, cordless mouse. With track-
ball for maximum comfort and ease of use.</P3>
      </P>
    </O>
    <O>
      <OL1>2</OL1>
      <OL2>79</OL2>
      <OL3>112</OL3>
      <P>
        <P1>3123</P1>
        <P2>PS 220V /D</P2>
        <P3>Standard power supply, 220V, for desktop
computers.</P3>

      </P>
    </O>
  </OS>
</P>
```

```
import java.math.BigDecimal;
import java.util.Date;
import java.util.List;

import javax.xml.bind.annotation.XmlElement;
import javax.xml.bind.annotation.XmlElementWrapper;
import javax.xml.bind.annotation.XmlRootElement;

@XmlRootElement(name="P")

public class PurchaseOrder
{
   @XmlElement(name="P1")
   public int    PONumber;

   @XmlElement(name="O1")
   public Date   OrderDate;

   @XmlElement(name="O2")
   public String OrderMode;

   @XmlElement(name="O3")
   public int    OrderStatus;

   @XmlElement(name="O4")
   public BigDecimal OrderTotal;

   @XmlElement(name="C")
   public Customer Customer;

   @XmlElementWrapper(name="OI")

   @XmlElement(name="I")
   public List<String>  instructions;

   @XmlElementWrapper(name="OS")

   @XmlElement(name="O")
   public List<OrderLine>  lines;

   public PurchaseOrder()
   {
   }
}
```

FIG. 13

SYSTEMS, METHODS, AND APPARATUS FOR ACCESSING OBJECT REPRESENTATIONS OF DATA SETS

BACKGROUND

Object-based application modules operate on objects that represent data sets stored at relational data stores. Because data sets represented as objects are stored within a memory of an application module differently as compared to the storage of those data sets within a relational data store, an impedance or format mismatch exists between objects and storage of data sets within relational data stores. For example, data sets represented as objects are typically stored hierarchically and data sets within a relational data store are typically stored in flat tables. This mismatch can be referred to as an object-relational impedance mismatch. Thus, the data sets as stored at the relational data store are converted to objects before such data sets are useful at object-based application modules.

Due to complications in converting data sets stored at relational data stores to objects that arise from the object-relational impedance mismatch and tradeoffs between data consistency, storage space efficiency, and access performance at relational data stores, various strategies have been employed to improve the performance of object-relational mapping software modules (or object mapping modules) that convert data sets from a native format of a relational data store to a native format of object. For example, data caching and lazy fetching (i.e., delaying requests for some elements of an object stored at a relation data store until access for those specific elements of the objects is requested) have been employed to mitigate the effects of object-relational impedance mismatch and tradeoffs between storage space efficiency and access performance at a relational data store.

Such strategies, however, are often ineffective for application modules in which an object is not frequently accessed or a complete representation of the object is required when the object is initially requested as in, for example, a web services application. Moreover, such strategies can be ineffective within environments in which multiple applications that access separate caches store and/or modify data stored within a relational data store. Because object-based application modules are becoming increasingly common, efficient object mapping modules are desirable.

BRIEF DESCRIPTION OF THE DRAWINGS

FIG. 11 illustrates an SQL/XML select statement, according to an embodiment.

FIG. 12 is a representation of an XML document based on the SQL/XML select statement of FIG. 11, according to an embodiment.

FIG. 13 is a representation of a Java® class including JAXB annotations related to the XML document of FIG. 12, according to an embodiment.

DETAILED DESCRIPTION

Figure 1:
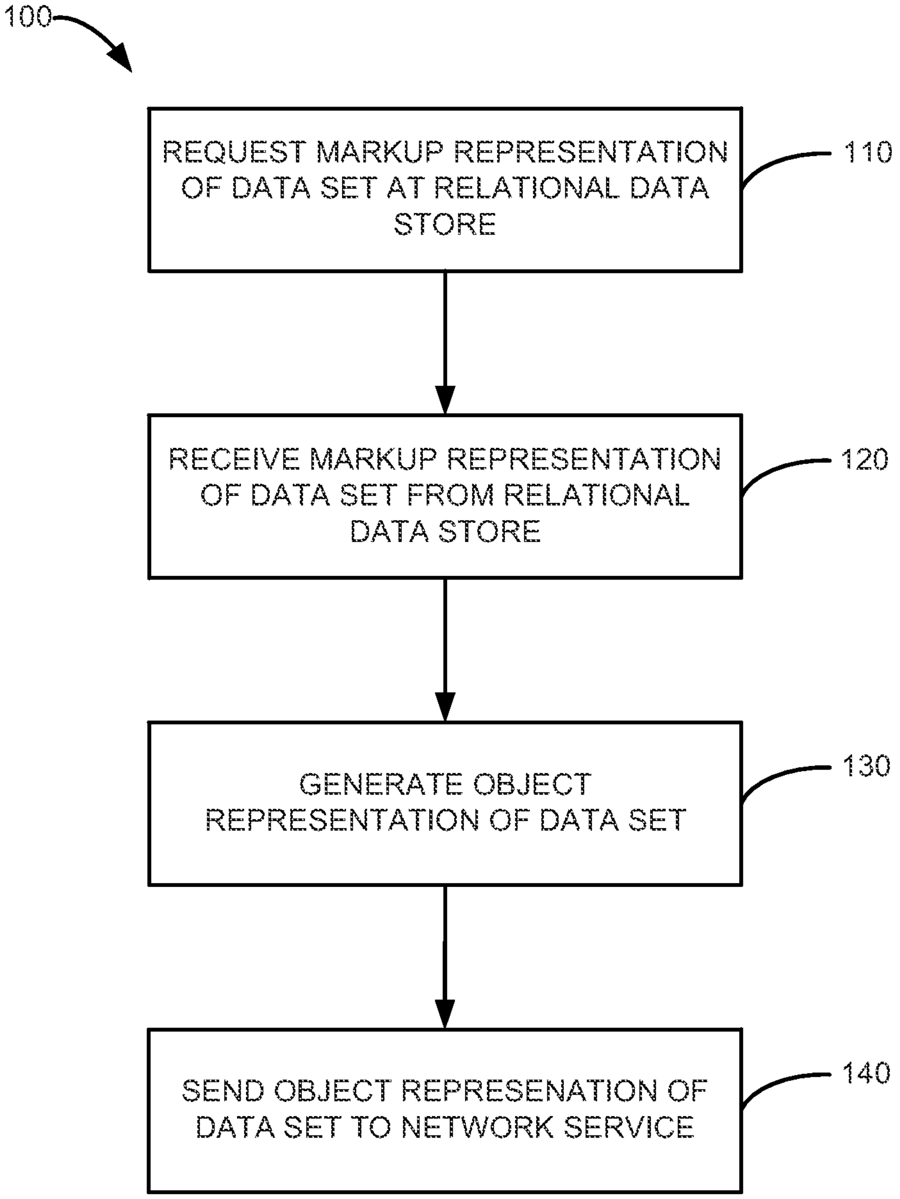
FIG. 1 is a flowchart of a process to generate an object representation of a data set, according to an embodiment.

Computing devices that provide application modules often rely on data objects (or objects) to manage data and functionality. In other words, software modules that implement application modules are frequently object-based or object-oriented.

Application modules are software modules stored at a memory and executed at a processor of a computing device that provide a service such as a data processing service, a data presentation service, and/or a data storage service. For example, an application module can be a word processing application, network service such as a web server, web application, remote data storage, remote data processing, and/or other service available via a network such as the Internet, a client application of a network service such as an electronic mail client or Internet browser application, or some other software module.

Objects are data sets that are organized within a memory of a computing device and can typically be referred to and/or operated on as a single unit. Furthermore, objects can include nested (or embedded or encapsulated) objects. Said differently, objects are typically hierarchical and, therefore, store nested (or subordinate or child) elements such as other objects. Thus, an object can include elements such as data values, method values that implement (or reference implementations of) various functionalities, other objects, references to other objects, and/or other data. That is, an object can encapsulate such data.

Data stores (such as databases) at which application modules store data sets are typically organized according to a relational model or schema. Such data stores can be referred to as relational data stores. Said differently, relational data stores store together related groups of data from a data set. For example, a relational data store can define a group of tables where each table is associated with an element (or the data type or information stored at that element) of an object. In other words, when an object is stored at a relational data store, the elements (or values of the elements) of that object are typically stored in separate tables. This architecture of relational data stores reduces data redundancy within relational data stores which improves utilization of storage space and data consistency within the database (e.g., to update information within the relational data store by accessing a minimal number of rows and columns in a minimal number of tables). Thus, each table at which elements of that object are stored is queried to access the object as represented within the relational data store. Said differently, the tables storing elements of the object are each queried to reconstruct the object.

Storage of an object within a relational data store is further complicated if that object (the nesting object) includes a nested object because the values of the elements of the nesting object are distributed across multiple tables within the relation data store and the values of the elements of the nested object are similarly distributed across multiple tables. Thus, to reconstruct (or access all the elements of) the nesting object, each table that stores an element of the nesting object and each table that stores an element of the nested object are accessed to retrieve the values for those elements.

Such storage of objects (or the elements of objects) distributed across multiple tables within a relational data store increases the amount of time to access all the data encapsulated in an object such as a nesting object (i.e., data in the table for the nesting object and data in the table for the nested object). More specifically, a software module in communication with a relational data store issues a separate access request to the relational data store for each of the elements of the nesting object and separate access requests to the relational data store for each of the elements of the nested object. The relational data store sends the requested rows and columns to the software module in response to each access request. This strategy can be referred to as select fetching. Furthermore, each access request from the software module to the relation data store can be referred to as a round trip. Thus, multiple round trips are employed to access all the data encapsulated within the nesting object.

Alternatively, some relational data stores include a join operation or functionality capable of joining multiple tables and returning a result that includes data from multiple tables. Thus, a software module in communication with the relational data store can issue a request to the relational data store for the elements of the nesting object and the elements of the nested object following a join of the table for the nesting object and a the table for the nested object. The relational data store sends the requested rows and columns to the software module in response to the access request. This strategy can be referred to as join fetching.

Accordingly, it is possible in a join fetching strategy to employ only a single round trip to access all the data encapsulated within the nesting object. However, in practice, a join fetching strategy is typically used together with a select fetching method because the number of rows produced within the relational data store in response to the join operation is the product of the rows in each table that is joined. For tables with large numbers of rows such as those in typical relational data stores, access performance of the relational data store can be so severely adversely affected due to both the memory requirements of storing large number of rows produced in response to the join operation and the processing resources to effect the join operation, that a combination of select fetching and join fetching strategies are typically employed to access data sets within the relational data store.

Additional complications arise in providing the data set in rows and columns to the object mapping module. For example, columns that are included in the table for the nesting object and the table for the nested object are included in the result of the join operation. Thus, duplicate columns that have redundant information can exist within a join result. Because each column in each row is sent from the relational data store to the object mapping module, such redundant column data adds processing and transmission overhead to transfer of the data to the object mapping module. Furthermore, per-column metadata (e.g., information about data type and/or length and other information related to columns) is typically provided by the relational data store with the requested data. Such metadata also adds transmission overhead to transfer of the data to the object mapping module. Moreover, the per-column metadata is accessed within the relational data store before the data is sent to the object mapping module. Such accesses increase processing overhead to provide the data to the object mapping module.

A further complication of storing objects at a relation data store is often referred to as the object-relational impedance mismatch. The object-relational impedance mismatch refers to the flat storage of data sets within a relational data store at rows and columns of tables and the hierarchical storage of data sets encapsulated within objects. In other words, when a software module receives rows and columns of data values representing elements of an object from a relational data store, the software module parses the rows and columns and stores the data values at the elements of the object. Said differently, the native format of storage at the relational data store differs from the native format of storage at an object.

Embodiments discussed herein can improve the performance of object mapping modules by introducing an additional representation of a data set (i.e., an intermediate data format or representation) between the native format of storage at the relational data store and the native format of storage at objects. In other words, despite additional conversion to and from the intermediate data representation, performance of object mapping modules can be improved by employing the intermediate data format. More specifically, performance of object mapping modules can be improved by converting data sets stored in rows and columns at a relational data store to a markup representation of the data sets before the data sets are provided to the object mapping modules. The object mapping module can then convert the markup representation of the data set to an object representation of the data set (i.e., an object). Additionally, an object mapping module can provide the markup representation of the data set directly to, for example, an application module that communicates with clients using markup representations of data sets rather than object representations of data sets.

As a specific example, an object mapping module receives a request for an object representation of a data set from a network service. In response to the request, the object mapping module requests a markup (e.g., Extensible Markup Language ("XML")) representation of the data set, in a format specified in the request, from a relational data store. More specifically, the object mapping module requests that the data set be sent to the object mapping module from the relational data store in the markup representation. Said differently, rather than provide a collection of rows and columns to the object mapping module in response to a request for a data set, the relational data store first converts the data set from the native format (i.e., rows and columns) of the relational data store to a markup representation, and provides the markup representation as a single column result to the object mapping module (i.e., the markup representation of the data set is provided to the object mapping module as a single column of data from the relational data store). The object mapping module then converts the markup representation to an object representation, and provides the object representation to the network service.

Although the inclusion of additional data in a markup representation of a data set (e.g., the markups or tags of the markup representation) suggests decreased performance due to additional processing and/or transmission overhead, providing the data set to the object mapping module in a markup representation can result in more rapid and efficient access to the data set. For example, tags of the markup representation can be compact (or abbreviated) to reduce the transmission and/or processing overhead associated with the markup representation. Additionally, because fewer columns are transferred when using the markup representation (i.e., a single column for the markup representation rather than multiple columns for the native rows and columns format of the relation data store), less per-column metadata is accessed and transferred. Indeed, when a data set is requested from a relational data store in a markup representation using compact tags, data processing at the relational data store and data transmission from the relational data store to the object mapping module can be greatly reduced as compared to a request for the same data set in the native rows and columns format of the relation data store.

Furthermore, a markup representation of a data set is typically of a hierarchical structure. Similarly, an object representation of a data set is typically of a hierarchical structure. Because the markup representation and the object representation share a hierarchical structure, conversion at an object mapping module of the markup representation of a data set to the object representation of the data set can be more efficient than conversion of the data set in the native rows and columns format of a relational data store to the object representation. Thus, because the markup representation can reduce processing and transmission overhead at the relational data store and because conversion from the markup representation to the object representation can be efficient, employing an intermediate format can improve performance of an object mapping module despite introducing an additional representation of data sets between the object mapping module and the relational data store.

As used in this specification, the singular forms "a," "an," and "the" include plural referents unless the context clearly dictates otherwise. Thus, for example, the term "object mapping module" is intended to mean one or more object mapping modules or a combination of object mapping modules. Additionally, as used herein, the term "module" refers to circuitry and/or software, firmware, programming, machine- or processor readable instructions, commands, or code that are stored at a memory and executed or interpreted at a processor.

FIG. 1 is a flowchart of a process to generate an object representation of a data set, according to an embodiment. Process 100 can be implemented as a hardware module and/or a software module. For example, process 100 can be implemented as application-specific circuitry or as a software module including instructions stored at a memory and executed at a processor in communication with the memory. As a specific example, process 100 can be implemented at an object mapping module.

A markup representation of a data set is requested at a relational data store at block 110. A particular format specifying identifiers of tags and/or attributes, for example, of the markup representation can be requested. More specifically, the request can define element identifiers (e.g., identifiers of tags and/or attributes) and specify which values from data tables (e.g., values stored at rows and columns of the data tables) of a relational data store should be stored at elements with particular identifiers. In other words, the request for a markup representation can specify a markup format or schema of the markup representation and at which elements of that markup format values from the data set will be stored in the markup representation. For example, an object mapping module can generate a request for a markup representation of a data set based on XML extensions of the Structured Query Language ("SQL/XML") at a SQL relational database in response to a request for an object representation of the data set and send the generated request to the SQL relational database. Alternatively, the markup representation of the data set can be requested using another request format such as Microsoft® SQLXML.

The markup representation of the data set is then received at block 120 from the relational data store. In some embodiments, the request for the markup representation can be a request for markup representations of multiple data sets. Accordingly, markup representations of multiple data sets can be received at block 120.

An object representation of the data set is then generated from the markup representation of the data set at block 130. For example, elements of the markup representation of the data set identified by tags of the markup representation (i.e., identifiers of the elements or data values of the data set within the markup representation) can be copied or inserted into elements of the object representation of the data set. In some embodiments, the markup representation of the data set and the object representation of the data set can share a common hierarchical structure. The object representation of the data set generated at block 130 is then sent to an application module at block 140.

In some embodiments, the object representation of the data set can be a Java® object and the markup representation of the data set can be an XML document. The Java® object can be generated at block 130 from the XML document using the Java® Architecture for XML Binding ("JAXB") or another framework, hardware module, and/or software module stored at a memory and executing at a processor in communication with the memory to unmarshall the XML document to a Java® object (i.e., to convert the XML document to the Java® object). In other embodiments, the object representation can be another object and the markup representation can be an XML document or be based on some other markup format.

Process 100 can include blocks in addition to those illustrated in FIG. 1. For example, an object mapping module can request a compact (or abbreviated) format of the markup representation and process 100 can include a block for expanding (or unabbreviating) the compact format (e.g., abbreviated tags) to an expanded (or unabbreviated or full) format (e.g., unabbreviated or full tags). Similarly, an object mapping module can receive a representation selector (or selector) from an application module indicating that a markup representation rather than an object representation is requested, and block 130 can be removed from process 100 such that the markup representation is provided to the network service. Additionally, one or more blocks can be rearranged. Furthermore, although process 100 is discussed above with reference to an object mapping module, process 100 is applicable within other environments.

Figure 2:
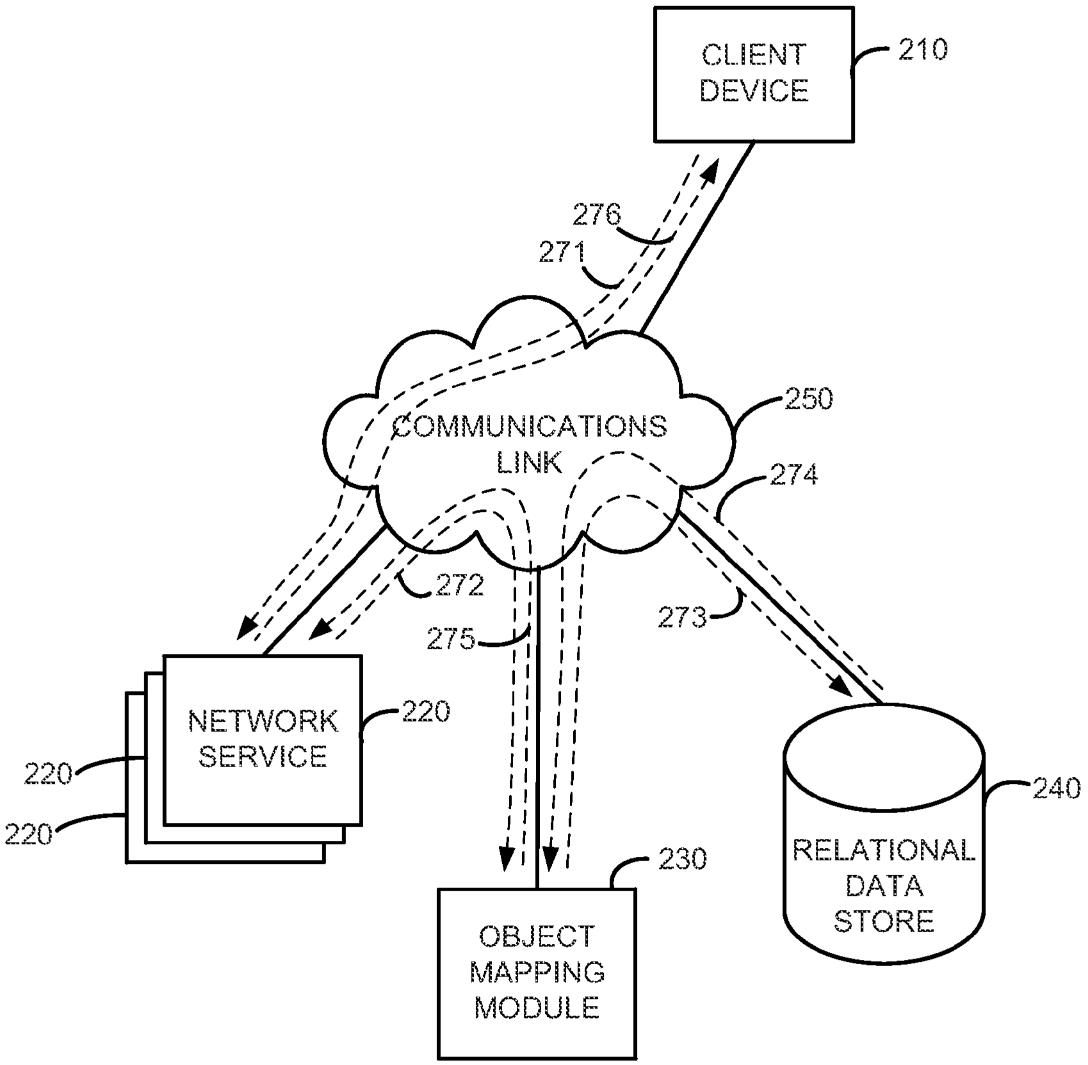
FIG. 2 is a schematic block diagram of a system to provide an object representation of a data set to a client, according to an embodiment.

FIG. 2 is a schematic block diagram of a system to provide an object representation of a data set to a client, according to an embodiment. The system illustrated in FIG. 2 includes network services 220, object mapping module 230, and relational data store 240. Network service 220, object mapping module 230, and relational data store 240 are operatively coupled one with another via communications link 250.

Figure 3:
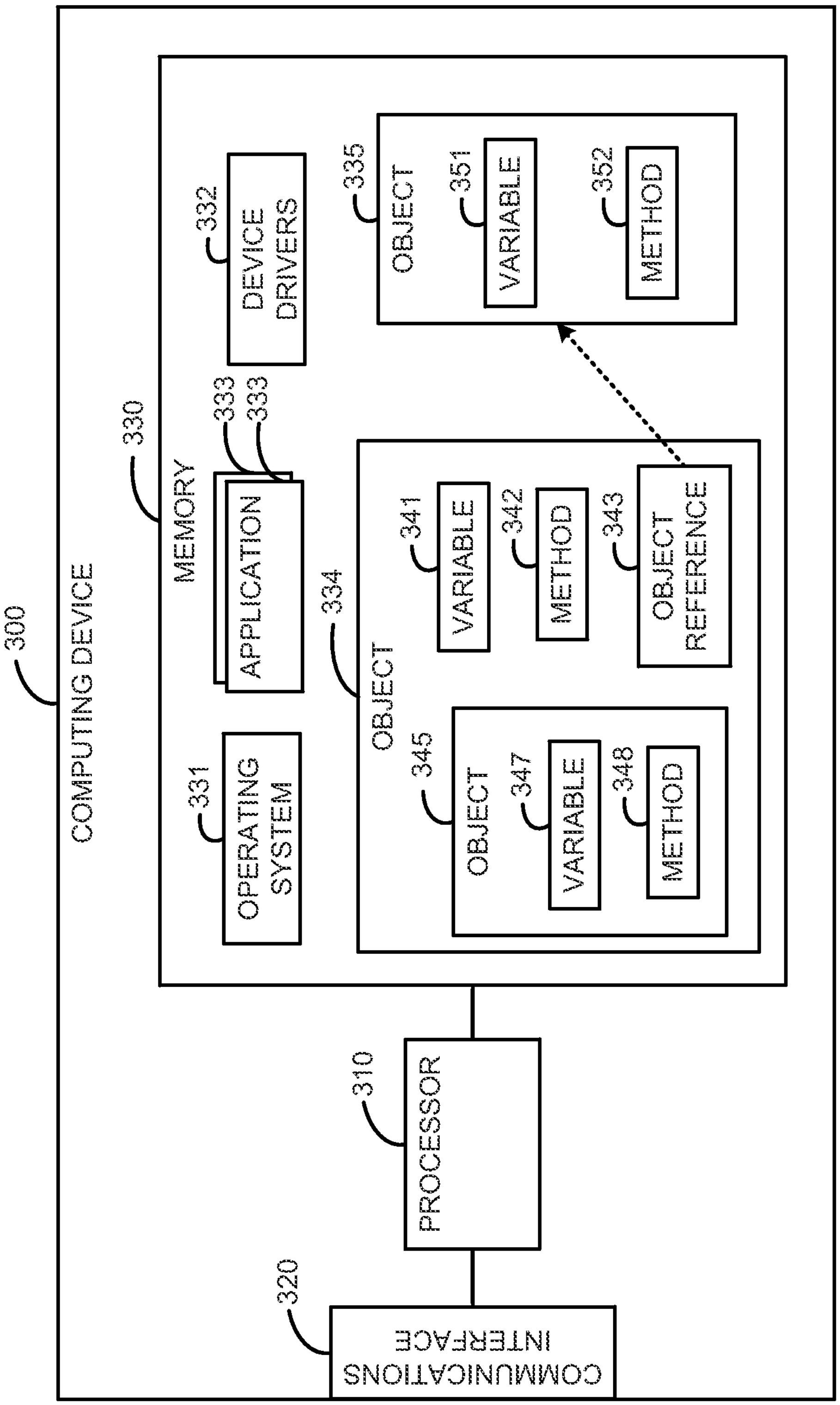
FIG. 3 is a schematic block diagram of a computing device, according to an embodiment.

Client device 210 is a computing device such as, for example, a personal computer, a portable computer, a mobile device such as a personal digital assistant ("PDA") or a smartphone, or some other computing device. FIG. 3 is a schematic block diagram of a computing device, according to an embodiment. FIG. 3 illustrates a schematic block diagram of a computing device, according to an embodiment. As illustrated in FIG. 3, computing device 300 includes communications interface 320, processor 310, and memory 330. Processor 310 is operatively coupled to communications interface

320 and memory 330. Typically, as illustrated in FIG. 3, memory 330 includes instructions or codes (e.g., computer codes or object codes) defining software modules that are executed by processor 310 during operation of computing device 310. For example, memory 330 includes instructions that define operating system 331, device drivers 332, and applications 333 (e.g., software application programs). In other words, operating system 331, device drivers 332, applications 333, and other software modules stored as instructions (not shown) at memory 330 and executed at processor 310 are hosted at computing device 300.

Additionally, objects (or object representations of data sets) can be stored at memory 330. As discussed above, an object is a data set that is organized within a memory of a computing device and can typically be referred to and/or operated on as a single unit. Furthermore, objects can include nested or embedded objects. Thus, an object can include elements such as data values, methods that implement (or reference implementations of) various functionalities, other objects, references to other objects, and/or other data. That is, an object can encapsulate such data.

As illustrated in FIG. 3, memory 330 includes object 334 and object 335. Object 334 encapsulates variable 341, method 342, object reference 343, and object 345. Variable 341, method 342, object reference 343, and object 345 can be referred to as elements of object 334. Object reference 343 is a reference (or pointer) to object 335, which includes variable 351 and method 352. In other words, object reference 343 refers to (or identifies) the location within memory 330 (or memory location) at which object 335 is stored. Nested object 345 includes variable 347 and method 348. Thus, a software module such as application 333 hosted at computing device 300 can access a value stored at variable 347 by referencing variable 347 within object 345 within object 334. In a C-language- or Java®-style notation, variable 347 can be referenced as follows:

<OBJECT 334>.<OBJECT 345>.<VARIABLE 347>

Communications interface 320 is an interface accessible to processor 310 to communicate with (i.e., transmit symbols representing data to and receive such symbols from) other processors and/or computing devices via a communications link. In other words, communications interface 320 can receive data from processor 310 and transmit symbols representing that data via a communications link. Moreover, communications interface 320 can receive symbols from other communications interfaces via a communications link and send data represented by those symbols to processor 310. For example, communications interface 320 can be a telephone network interface, a twisted-pair network interface, a coaxial network interface, a fiber-optic network interface, a wireless network interface such as a wireless local area network ("WLAN") or a cellular network, and/or some other network or communications interface.

Referring to FIG. 2, communications link 250 can include any connector and/or system that allow client device 210, network services 220, object mapping module 230, and relational data store 240 to communicate (e.g., exchange signals or symbols representing data) one with another. For example, communications link 250 can be one or more of a cable (e.g., telecommunication cable, twisted-pair cable, coaxial cable, or fiber-optic cable), wireless link or connection (e.g., radio-frequency link, wireless optical link, or infrared link), or any other connector or system that supports transmission of communications symbols. Additionally, communications link 250 can include a communications network or combination of communications networks capable of transmitting information (e.g., symbols or signals representing data) such as, for example, an Ethernet network, a fiber-optic network, a wireless network, an intranet, and/or the Internet.

In some embodiments, communications link 250 can include multiple communications links and/or communications networks operatively coupled one to another by, for example, bridges, routers, switches, hubs, and/or gateways. For example, client device 210 can be operatively coupled to a cellular network (not shown) and a network service from network services 220 can be operatively coupled to a fiber-optic network (not shown). The cellular network and fiber-optic network can each be operatively coupled one to another via one or more network bridges, routers, switches, and/or gateways such that the cellular network and the fiber-optic network are operatively coupled to form a communications link. Alternatively, the cellular network and fiber-optic network can each be operatively coupled one to another via one or more additional networks. For example, the cellular network and the fiber-optic network can each be operatively coupled to the Internet such that the cellular network, the fiber-optic network and the Internet are operatively coupled to form a communications link. Furthermore, communications link 250 can include one or more direct connections between client device 210, network services 220, object mapping module 230, and/or relational data store 240. For example, relational data store 240 can be directly coupled to object mapping module 230.

Each of network services 220 is a service accessible to client device 210 via communications link 250. For example, a network service from network services 220 can be a data storage service, a data processing service, an electronic mail service, and/or a web service such as a web server or web application. Each of network services 220 can be a hardware module, a software module stored at a memory and executed at a processor in communication with the memory, and/or a combination of one or more hardware modules and/or software modules. In some embodiments, network services 220 can be virtual machines or virtual appliances hosted at one or more computing devices.

Object mapping module 230 receives requests, for example, from network services 220 for representations of data sets stored at relational data store 240, accesses markup representations of the data sets stored at relational data store 240, and provides the requested representations of the data sets to network services 220. Object mapping module 230 can be a hardware module, a software module (e.g., an application program, a software library such as a dynamically loadable library, or operating system service) stored at a memory and executed at a processor in communication with the memory, and/or a combination of one or more hardware modules and/or software modules. In some embodiments, object mapping module 230 can be a virtual machine or virtual appliance hosted at a computing device.

For example, a network service from network services 220 can be a virtual machine including a Java®-based web application that operates on Java® objects. Although this example will be discussed with reference to a single network service from network services 220, object mapping module 230 can receive and process requests for representations of data sets (e.g., request markup representations from one or more relational data stores such as relational data store 240 and generate the requested representations based on the markup representations) from multiple network services from network services 220. As illustrated in FIG. 2, client device 210 can request information from the network service from network services 220 along communication path 271. Communication paths 271, 272, 273, 274, 275, and 276 are logical and do not necessarily indicate each physical computing device or network device traversed by the data symbols or data signals transmitted along the communication paths.

In response to the request from client device 210, the network service from network services 220 can request a Java® object-based representation of a data set stored at multiple tables within relational data store 240 from object mapping module 230 along communication path 272. Object mapping module 230 then requests a markup representation of the data set from relational data store 240 along communication path 273. Relational data store 240 accesses the multiple tables at which the requested data set is stored, and provides the markup representation of the data set to object mapping module 230 along communication path 274.

Figure 4:
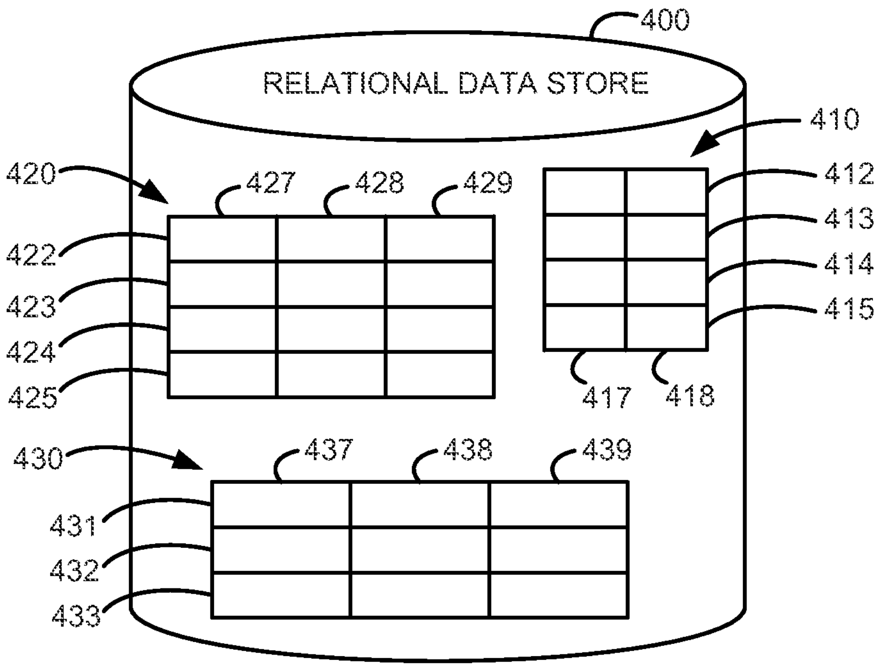
FIG. 4 is an illustration of a relational data store, according to an embodiment.

FIG. 4 is an illustration of a relational data store, according to an embodiment. Relational data store 400 can be a hardware module, a software module stored at a memory and executed at a processor in communication with the memory, and/or a combination of one or more hardware modules and/or software modules. In some embodiments, relational data store 400 can be a virtual machine or virtual appliance hosted at a computing device.

Relational data store 400 stores data in tables (also referred to as relations) 410, 420, and 430. Data sets stored in each of tables 410, 420, and 430 are related to the other data sets stored at that table. For example, a relational data store typically defines a group of tables each having a number of rows (also referred to as tuples) and columns (also referred to as attributes). Data sets with data values that represent common attributes are stored as rows within each table. The data sets are arranged within the rows of a table such that values within each row that represent a common attribute are stored in the column associated with that attribute.

For example, as illustrated in FIG. 4, table 410 includes rows 412, 413, 414, and 415 and columns 417 and 418. Table 420 includes rows 422, 423, 424, and 425 and columns 427, 428, and 429. Table 430 includes rows 432, 433, 434 and 435 and columns 437, 438, and 439. As an example, table 420 can store data sets related to files. A filename (or another identifier of a file) can be stored at column 427, a number of bytes in a file can be stored at column 428, and a description of a file (or other metadata) can be stored at column 429. Thus, a data set related to a first file can be stored at row 422 such that the filename of the first file is stored at column 427 within row 422, the number bytes in the first file is stored at column 428 within row 422, and a description of the first file is stored at column 429 within row 422. A data set related to a second file can be stored at row 423 such that the filename of the second file is stored at column 427 within row 423, the number bytes in the second file is stored at column 428 within row 423, and a description of the second file is stored at column 429 within row 423. A data set related to a third file can be stored at row 424 such that the filename of the third file is stored at column 427 within row 424, the number bytes in the third file is stored at column 428 within row 424, and a description of the third file is stored at column 429 within row 424. A data set related to a fourth file can be stored at row 425 such that the filename of the fourth file is stored at column 427 within row 425, the number bytes in the fourth file is stored at column 428 within row 425, and a description of the fourth file is stored at column 429 within row 425.

Referring to FIG. 2, after receiving the markup representation of the data set, object mapping module 230 then generates the Java® object-based representation of the data set by mapping the markup representation of the data set to the Java® object-based representation of the data set. In other words, object mapping module 230 can allocate a portion of a memory accessible to object mapping module 230 for a Java® object and can store values included at the markup representation of the data set at corresponding elements of the Java® object. Said differently, object mapping module 230 can instantiate a Java® object and initialize that Java® object with values from the markup representation of the data set.

The Java® object is then sent to the network service from network services 220 along communication path 275. The network service from network services 220 then sends the requested information to client device 210 along communication path 276. For example, the network service from network services 220 can access one or more elements of the Java® object and send the values of those elements to client device 210 along communication path 210. In some embodiments, the network service from network services 220 can send the Java® object to client device 210 along communication path 276.

Although illustrated separately in FIG. 2, the network service from network services 220, object mapping module 230, and/or relational data store 240 can be hosted at a single or common computing device. For example, object mapping module 230 and relational data store 240 can be implemented as virtual machines hosted at a common computing device and communication link 250 includes a virtual network connection between object mapping module 230 and relational data store 240.

Figure 5:
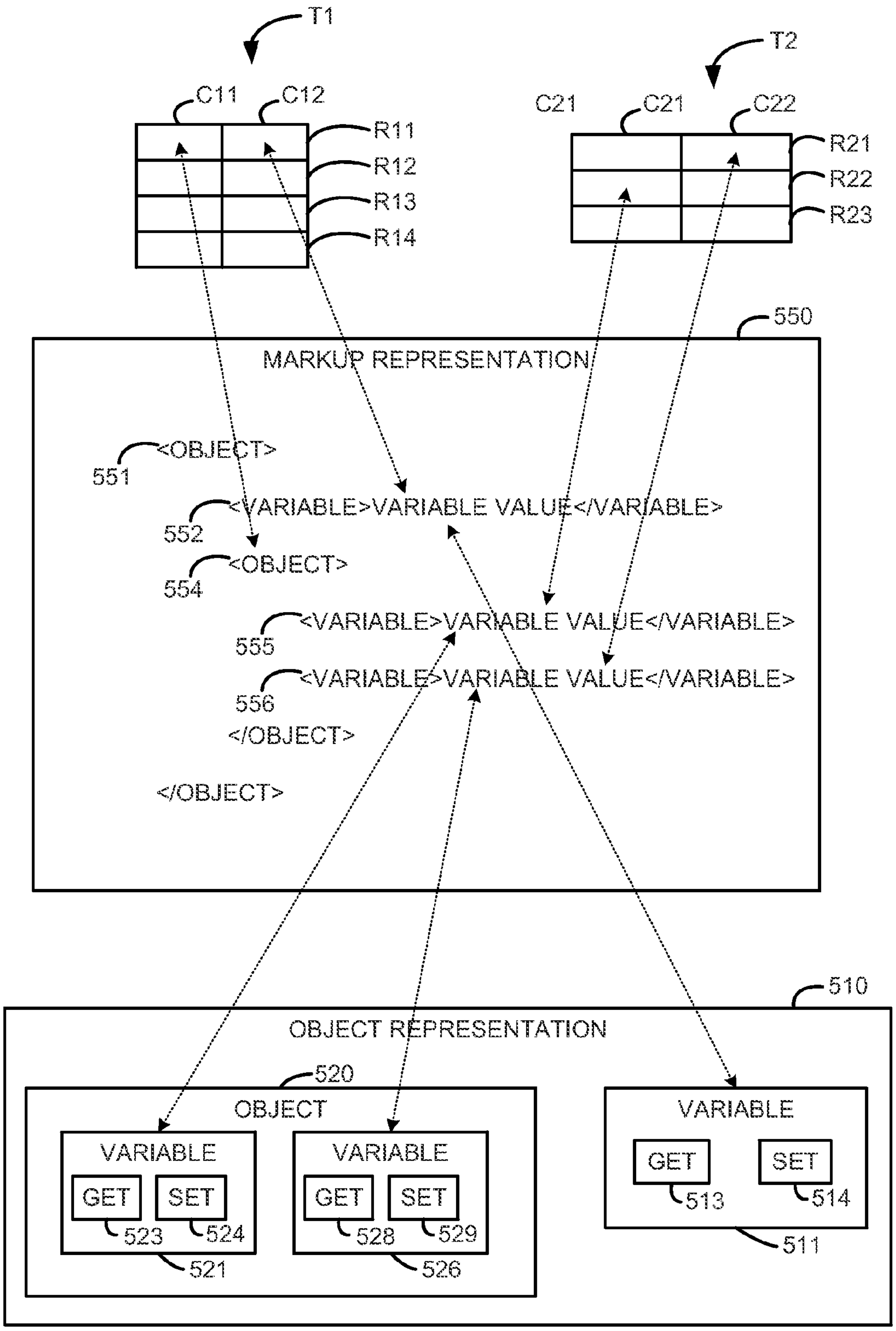
FIG. 5 is an illustration of relationships between tables within a relational data store storing a data set, a markup representation of the data set, and an object representation of the data set, according to an embodiment.

FIG. 5 is an illustration of relationships between tables within a relational data store storing a data set, a markup representation of the data set, and an object representation of the data set, according to an embodiment. Tables T1 and T2 can be included in, for example, a relational data store such as relational data store 400 illustrated in FIG. 4. Table T1 includes rows R11, R12, R13, and R14 and columns C11 and C12. Table T2 includes rows R21, R22, and R23 and columns C21 and C22. As discussed above in relation to FIG. 4, related data sets can be stored as rows in each of tables T1 and T2. In particular, table T1 can store a first data set at row R11 and table T2 can store a second data set at row R22 that is related to the first data set. For example, the second data set can be encapsulated within the first data set in a markup representation and/or an object representation of the data set.

Markup representation 550 illustrates a markup representation of the first data set and the second data set. More specifically, markup representation includes object element 551, variable element 552, object element 554, variable element 555, and variable element 556. As illustrated in FIG. 5, markup representation 550 includes multiple tags that delineate the elements of markup representation 550. For example, markup representation 550 includes opening tags related to objects and variables (<OBJECT> and <VARIABLE>, respectively) and closing tags related to objects and variables (</OBJECT> and </VARIABLE>, respectively). Additionally, markup representation 550 includes variable values (VARIABLE VALUE). In other embodiments, other opening and/or closing tags can be included within a markup representation of a data set. The opening and closing tags and values define the elements of markup representation 550. For example, element 552 includes the opening tag <VARIABLE>, the value VARIABLE VALUE, and the closing tag </VARIABLE>. Additionally, an element of markup representation 550 can encapsulate other elements that are included between the opening tag and closing tag for that element. For example, element 554 encapsulates elements 555 and 556.

Object representation 510 illustrates an object representation of the first data set and the second data set. Object representation 510 includes variable element 511 and object element 520. Object element 520 includes variable element 521 and variable element 526. Object representation 510 also includes mechanisms for accessing (e.g., reading and writing values from and to, respectively, variable 511. More specifically, object representation 510 includes get method 513 to read a value of variable 511 and set method 514 to store a value to variable 514. Similarly, object 520 includes get methods 523 and 528 and set methods 524 and 529 to access variables 521 and 526, respectively.

The first data set and the second data set are represented in the markup representation by storing the value of column C12 within row R11 at variable element. In other words, VARIABLE VALUE at element 552 is the value of column C12 within row R11. Similarly, the value of column C21 within row R21 is stored at variable element 555 and the value of column C22 within row R21 is stored at variable element 556. Additionally, the value of column C11 within row R11 is related to object element 554. For example, the value of column C11 within row R11 can be a reference to row R22 or a value that is stored at another column (not shown) within row R22 of table T2 that is used to identify the second data set from the first data set.

Furthermore, the first data set and the second data set are represented in object representation 510 by storing the value of element 552 at variable element 511, the value of element 555 at variable element 521 and the value of element 556 at variable element 526. Thus, each of markup representation 550 and object representation 510 can represent the first data set and the second data set, and object representation 510 can be derived from markup representation 550.

Figure 6:
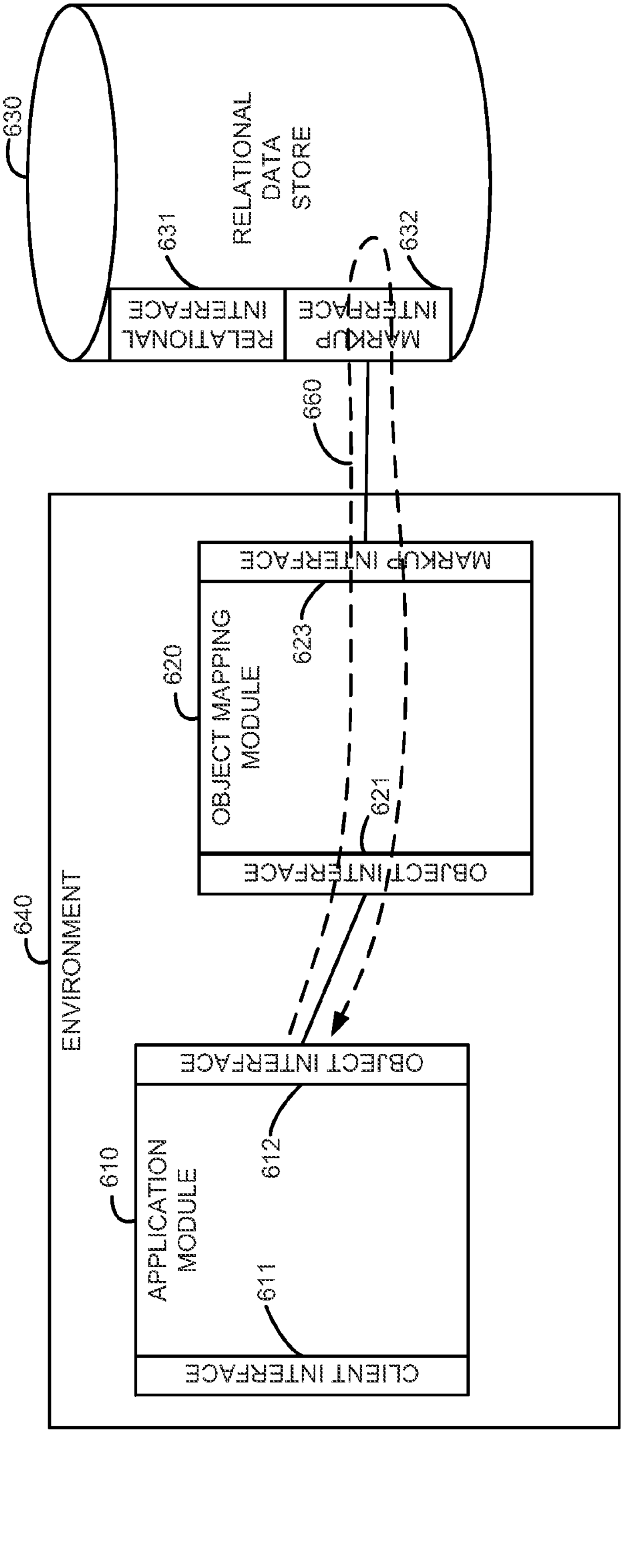
FIG. 6 is a schematic block diagram of a system to generate an object representation of a data set, according to an embodiment.

FIG. 6 is a schematic block diagram of a system to generate an object representation of a data set, according to an embodiment. The system illustrated in FIG. 6 includes application module 610, object mapping module 620, relational data store 630, and environment 640. Application module 610 and object mapping module 620 are included within (or hosted at) environment 640.

Environment 640 is an execution context for application module 610 and object mapping module 620 such as runtime environment, an operating system, and/or a virtual machine. Environment 640 defines or provides a communication interface (not shown) via which application module 610 and object mapping module 620 are operatively coupled. For example, environment 640 can define a shared memory interface, a message passing interface, a system call interface, a method call or invocation interface, and/or some other interface via which application module 610 and object mapping module 620 can communicate one with another.

In some embodiments, environment 640 can be an application module. That is, environment 640 can be an application module and application module 610 and object mapping module 620 can be portions of that application module. For example, application module 610 can be a group of routines and/or classes that collectively receive requests for object representations of data sets from other portions of environment 640 (or from external clients such as network clients) at client interface 611, process (e.g., interpret and/or manipulate) object representations of data sets, and/or provide those object representations via client interface 611. Object mapping module 620 can also be a group of routine and/or classes within environment 640. For example, object mapping module can be a framework, a statically-linked library, and/or a dynamic link library ("DLL") associated with (or linked to) application module 610 and/or other portions of environment 640. In some embodiments, environment 640 can be a Java® virtual machine and object mapping module 620 can be a collection of classes such as Java® classes that are callable by application module 610 and/or other portions of environment 640.

Application module 610 includes client interface module 611 and object interface module 612. Client interface module 611 is a mechanism via which application module 610 can communicate with clients (or users) of application module 610. Such clients can be environment 640, other application modules of environment 640, and/or clients that are external to environment 640 such as clients to which application module 610 is accessible via a communications link. An interface is a mechanism for interaction between two or more modules and can include a hardware module, a software module hosted at a computing device, and/or a combination of hardware modules and/or software modules. For example, client interface module 611 can be a shared memory interface, a message passing interface, a system call interface, a method call or invocation interface, and/or some other interface via which application module 610 with other portions of environment 640.

In some embodiments, client interface 611 can include an Ethernet communications interface module including a physical Ethernet port (i.e., a physical connector) and an Ethernet software stack hosted at application module 610. For example, client interface module 611 can be a Hypertext Transport Protocol ("HTTP") interface module. Object interface module 612 is a mechanism via which application module 610 can communicate with object mapping module 620 using object representations of data sets.

Object mapping module 620 includes object interface module 621 and markup interface module 623. Object interface module 621 is a mechanism via which object mapping module 620 can communicate with application module 610 using object representations of data sets. Markup interface module 623 is a mechanism via which object mapping module 620 can communicate with relational data store 630 using markup representations of data sets. Object mapping module 620 maps (or converts) markup representations of data sets to object representations of data sets. For example, object mapping module 620 can include a JAXB functionality to convert XML document representations of data sets to Java® objects.

Relational data store 630 stores data sets within tables and includes relational interface module 631 and markup interface module 632. Relational interface module 631 is a mechanism via which relational data store 630 can communicate data sets stored at tables of relational data store 630 to clients of relational data store 630 by sending tabular representations of data sets (i.e., data sets represented in rows and columns) to those clients. Markup interface module 632 is a mechanism via which relational data store 630 can communicate data sets stored at tables of relational data store 630 to clients of relational data store 630 by sending markup representations of data sets to those clients. For example, markup interface module 632 can be an SQL/XML interface module or a Microsoft® SQLXML interface module.

As illustrated by communication path 660 in FIG. 6, application module 610 can request an object representation of a data set a relational data store 630 via object interface module 612 and object interface module 621. Object mapping module 620 requests a markup representation of that data set via markup interface module 623 and markup interface module 632. In some embodiments, object mapping module 620 can request that the markup representation of that data set have a particular format. For example, object mapping module 620 can specify the names of elements or tags of the markup representation of the data set. Furthermore, in some embodiments, object mapping module 620 can specify the names, if any, of attributes (e.g., XML attributes) of the markup representation of the data set within the request for the markup representation.

Relational data store 630 generates (or defines) a markup representation according to the format, if any, specified by object mapping module 620 and sends the markup representation of the data set to object mapping module 620 via markup interface module 632 and markup interface module 623. Object mapping module 620 maps (or converts) the markup representation of the data set to an object representation of the data set and sends the object representation of the data set to application module 610 via object interface module 621 and object interface module 612. Application module 610 then provides some requested service and/or information to a client (or user) of application module 610 via client interface module 611.

Figure 7:
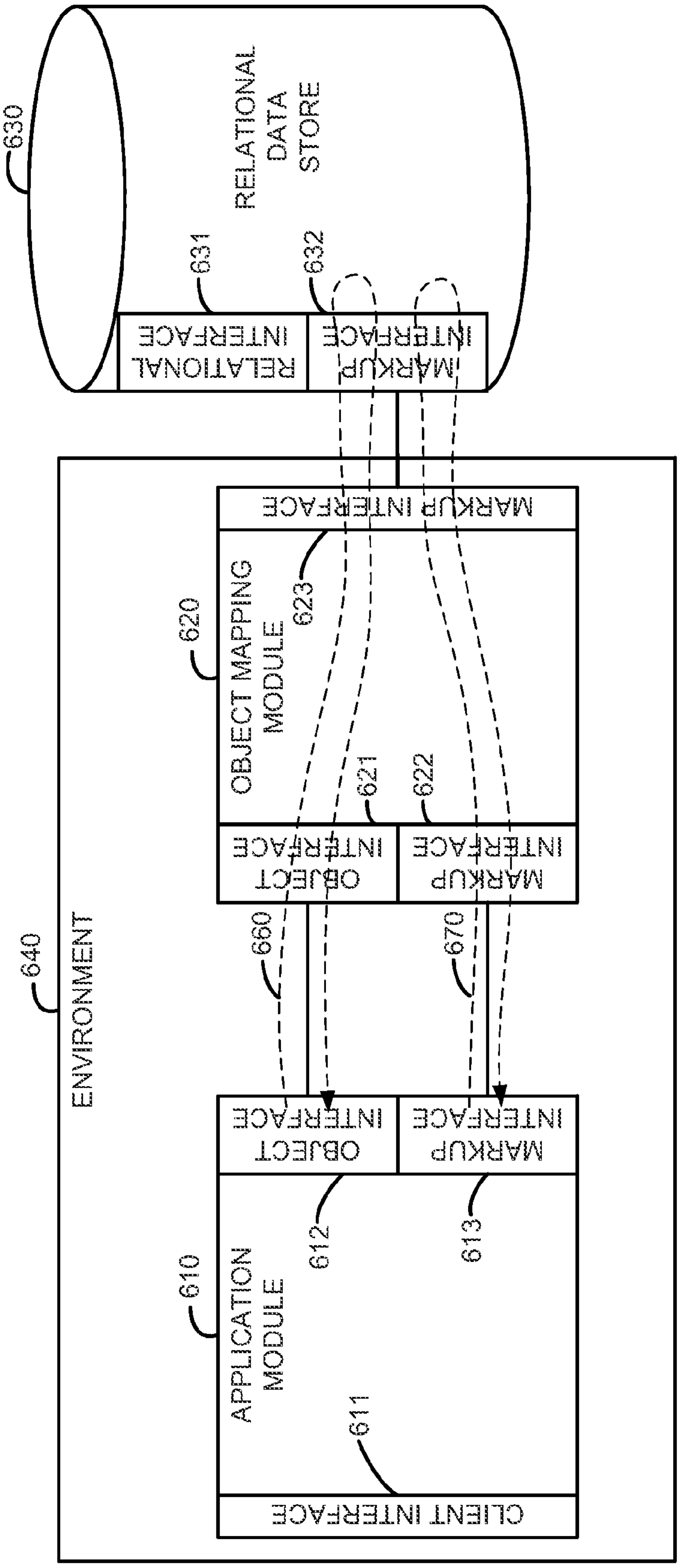
FIG. 7 is a schematic block diagram of another system to generate an object representation of a data set, according to an embodiment.

FIG. 7 is a schematic block diagram of another system to generate an object representation of a data set, according to an embodiment. The system illustrated in FIG. 7 is similar to the system illustrated in FIG. 6 and includes application module 610, object mapping module 620, relational data store 630, and environment 640. In addition to object interface module 612 at application module 610, application module 610 includes markup interface module 613. Markup interface module 613 is a mechanism via which application module 610 can communicate with object mapping module 620 using markup representations of data sets. Similarly, in addition to object interface module 621, object mapping module 620 includes markup interface module 622. Markup interface module 622 is a mechanism via which object mapping module 620 can communicate with application module 610 using markup representations of data sets. Thus, application module 610 can request object representations and/or markup representations of data sets from object markup module 620.

Object mapping module 620 can receive requests for object representations and markup representations of data sets and request markup representations of those data sets from relational data store 630. Object mapping module 620 can receive the markup representations of the data sets and convert the markup representations of the data sets that were requested via object interface module 621 to object representations and forward those object representations to application module 610 via object interface module 621 and object interface module 612. If the request for a data set was received via markup interface module 622, object mapping module 620 can forward the markup representation received from relational data store 630 unaltered to application module 610 via markup interface module 622 and markup interface module 613. That is, the interface at which a request for a data set was received can be a representation selector that indicates whether a markup representation of the requested data set or an object representation of the requested data set should be provided to an application module. Alternatively, for example, a request for a markup representation of a data set and a request for an object representation of a data set can be received at a common interface of an object mapping module and each request can include a representation selector such as a parameter or argument (i.e., a value) that is associated with a markup representation of a data set or an object representation of a data set.

In some embodiments, application module 610 can request that the markup representation of a data set have a particular format. For example, application module 610 can specify the names of elements or tags of the markup representation of the data set. Furthermore, in some embodiments, application module 610 can specify the names, if any, of attributes (e.g., XML attributes) of the markup representation of the data set. Object mapping module 620 can request the markup representation from relational data store 630 in the format requested by application module 610. In some embodiments, object mapping module 620 can request the markup representation of the data set in a compact (or abbreviated) format. For example, tags, elements, and/or attributes of the markup representation can be abbreviated. Object mapping module 620 can receive the markup representation in the compact format and can expand the markup representation to have the format requested by application module 610. As an example, object mapping module 620 can request a markup representation of a data set in which all textual tag identifiers specified by application module 613 are abbreviate to the minimum characters to preserve uniqueness of those tag identifiers. After receiving the markup representation from relational data store 630, object mapping module 620 can expand the tag identifier to the full tag identifiers specified by application module 610.

Similar to communication path 660 discussed in relation to FIG. 6, communication path 670 illustrates access to a markup representation of a data set stored within tables at relational data store 630. Application module 610 can request a markup representation of a data set a relational data store 630 via markup interface module 613 and markup interface module 622. Object mapping module 620 requests a markup representation of that data set via markup interface module 623 and markup interface module 632. In some embodiments, object mapping module 620 can request that the markup representation of that data set have a particular format. For example, object mapping module 620 can specify the names of elements or tags of the markup representation of the data set in the request for the markup representation. Furthermore, in some embodiments, object mapping module 620 can specify the names, if any, of attributes (e.g., XML attributes) of the markup representation of the data set.

Relational data store 630 generates (or defines) a markup representation according to the format, if any, specified by object mapping module 620 and sends the markup representation of the data set to object mapping module 620 via markup interface module 632 and markup interface module 623. Object mapping module 620 determines that a markup representation of the data set should be sent to application module 610 (e.g., because the request for the data set was received via markup interface module 622), and sends the markup representation of the data set to application module 610 via markup interface module 622 and markup interface module 613. Application module 610 then provides some requested service and/or information to a client (or user) of application module 610 via client interface module 611.

Although FIGS. 6 and 7 illustrate a single application module in communication with an object mapping module, multiple application modules can request representations of data set from an object mapping module. For example, multiple application modules can request object representations of data sets from an object mapping module. In some embodiments, some application modules request object representations of data sets from an object mapping module and other application modules request markup representations of data from the object mapping module. In some embodiments, multiple application modules request object representations of data sets and markup representations of data sets from an object mapping module. Furthermore, application modules can communicate with multiple clients (or users).

Figure 8:
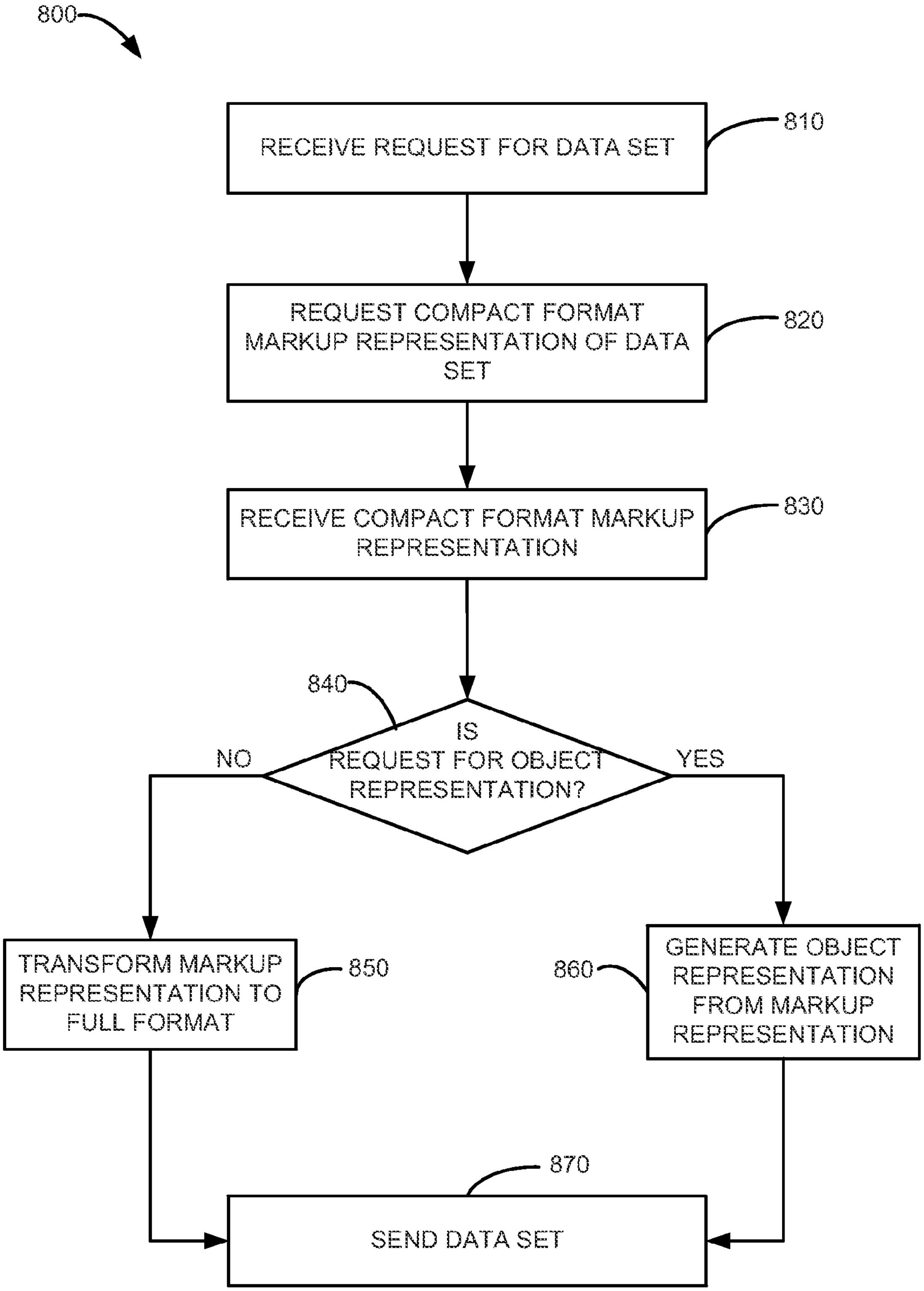
FIG. 8 is another flowchart of a process to generate an object representation of a data set, according to an embodiment.

FIG. 8 is a flowchart of another process to generate an object representation of a data set, according to an embodiment. Process 800 can be implemented as a hardware module and/or a software module. For example, process 800 can be implemented as application-specific circuitry or as a software module including instructions stored at a memory and executed at a processor in communication with the memory. As a specific example, process 800 can be implemented at an object mapping module.

A request for a data set is received at block 810. A request for a markup representation of the data set is generated at block 820 in response to the request received at block 810. The request for the markup representation of the data set is for a compact format of the markup representation. For example, the markup representation of the data set can be an XML document and the request for the markup representation can be a request conforming to SQL/XML or Microsoft® SQLXML in which tags and/or attributes are abbreviated identifiers. For example, an object mapping module can request that tags of the XML document at which filenames will be included be labeled "fname" rather than a more verbose "filename." The request for the markup representation can then be sent to, for example, a relational data store.

The compact format markup representation of the data set is received (e.g., from a relational data store) at block 830. At block 840, an object mapping module, for example determines if the request received at block 810 is for an object representation of the data set. For example, the request can be for an object representation if the request was received via an object interface. Alternatively, a representation selector (or selector or indicator) associated with an object representation can be provided to the object mapping module at block 810 (or before or after block 810) to indicate that the request is for an object representation or for another representation of the data set such as a markup representation.

If the request is not for an object representation, at block 840, the compact (or abbreviated) format markup representation received at block 830 can be transformed at block 850 to a full (or unabbreviated) format markup representation of the data set. In other words, abbreviated tags, attributes, and/or other portions of a markup representation can be unabbreviated at block 850. The data set is then sent at 870. If the request received at block 810 was not for an object representation of the data set, the markup representation of the data set generated at block 850 is sent at block 870.

If the request is for an object representation, at block 840, an object representation of the data is generated from the markup representation of the data set at block 850. For example, an object representation of the data set can be instantiated and initialized (or populated) with values of the data set from the markup representation of the data set. The data set is then sent at 870. If the request received at block 810 was for an object representation of the data set, the object representation of the data set generated at block 860 is sent at block 870.

Process 800 can include blocks in addition to those illustrated in FIG. 8. Additionally, one or more blocks can be rearranged. For example, the request for a data set received at block 810 can be a request for multiple data sets and process 800 can be repeated for each data set or multiple data sets can be requested at block 820, received at block 830, and send at block 870. Additionally, the request for the markup representation of the data set at block 820 can be for a full format of the markup representation and block 850 can be removed. Thus, in some embodiments, the markup representation received at block 830 can be sent unaltered (or unmodified) at block 870. Furthermore, although process 800 is discussed above with reference to an object mapping module, process 800 is applicable within other environments.

Figure 9:
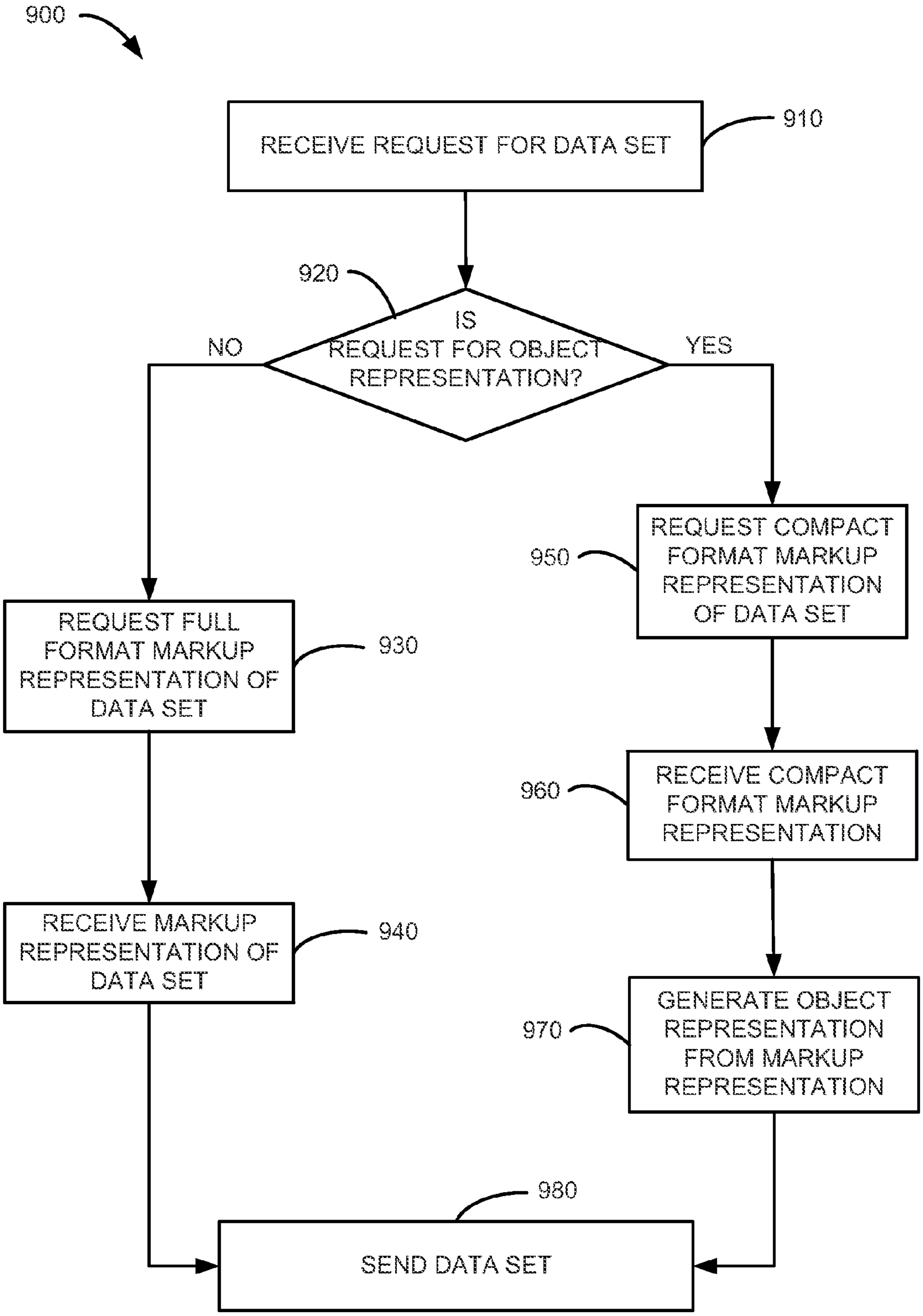
FIG. 9 is another flowchart of a process to generate an object representation of a data set, according to an embodiment.

FIG. 9 is a flowchart of another process to generate an object representation of a data set, according to an embodiment. Process 900 can be implemented as a hardware module and/or a software module. For example, process 900 can be implemented as application-specific circuitry or as a software module including instructions stored at a memory and executed at a processor in communication with the memory. As a specific example, process 900 can be implemented at an object mapping module.

A request for a data set is received at block 910. At block 920, an object mapping module, for example determines if the request received at block 910 is for an object representation of the data set. For example, the request can be for an object representation if the request was received via an object interface. Alternatively, a representation selector (or selector or indicator) associated with an object representation can be provided to the object mapping module at block 910 (or before or after block 910) to indicate that the request is for an object representation or for another representation of the data set such as a markup representation.

If the request is not for an object representation, at block 920, a request for a markup representation of the data set is generated at block 930 in response to the request received at block 910. The request for the markup representation of the data set is for a full format of the markup representation. For example, the markup representation of the data set can be an XML document and the request for the markup representation can be a request conforming to SQL/XML or Microsoft® SQLXML in which tags and/or attributes are unabbreviated identifiers. The request for the markup representation can then be sent to, for example, a relational data store. The full format markup representation of the data set is received (e.g., from a relational data store) at block 940. The full format markup representation of the data set is then sent (e.g., to a network service) at block 980.

If the request is for an object representation, at block 920, an object representation of the data is generated. A request for a markup representation of the data set is generated at block 950 in response to the request received at block 910. The request for the markup representation of the data set is for a compact format of the markup representation. For example, the markup representation of the data set can be an XML document and the request for the markup representation can be a request conforming to SQL/XML or Microsoft® SQLXML in which tags and/or attributes are abbreviated identifiers. The request for the markup representation can then be sent to, for example, a relational data store.

The compact format markup representation of the data set is received at block 960. An object representation of the data is generated from the markup representation of the data set at block 970. For example, values of the data set from the markup representation of the data set can be stored at memory locations included within an object representation at a memory of a computing device. The object representation of the data set generated at block 970 is sent (e.g., to a network service) at block 980.

Process 900 can include blocks in addition to those illustrated in FIG. 9. Additionally, one or more blocks can be rearranged. For example, a full format markup representation of the data set can be requested at block 950. Furthermore, although process 900 is discussed above with reference to an object mapping module, process 900 is applicable within other environments.

Figure 10:
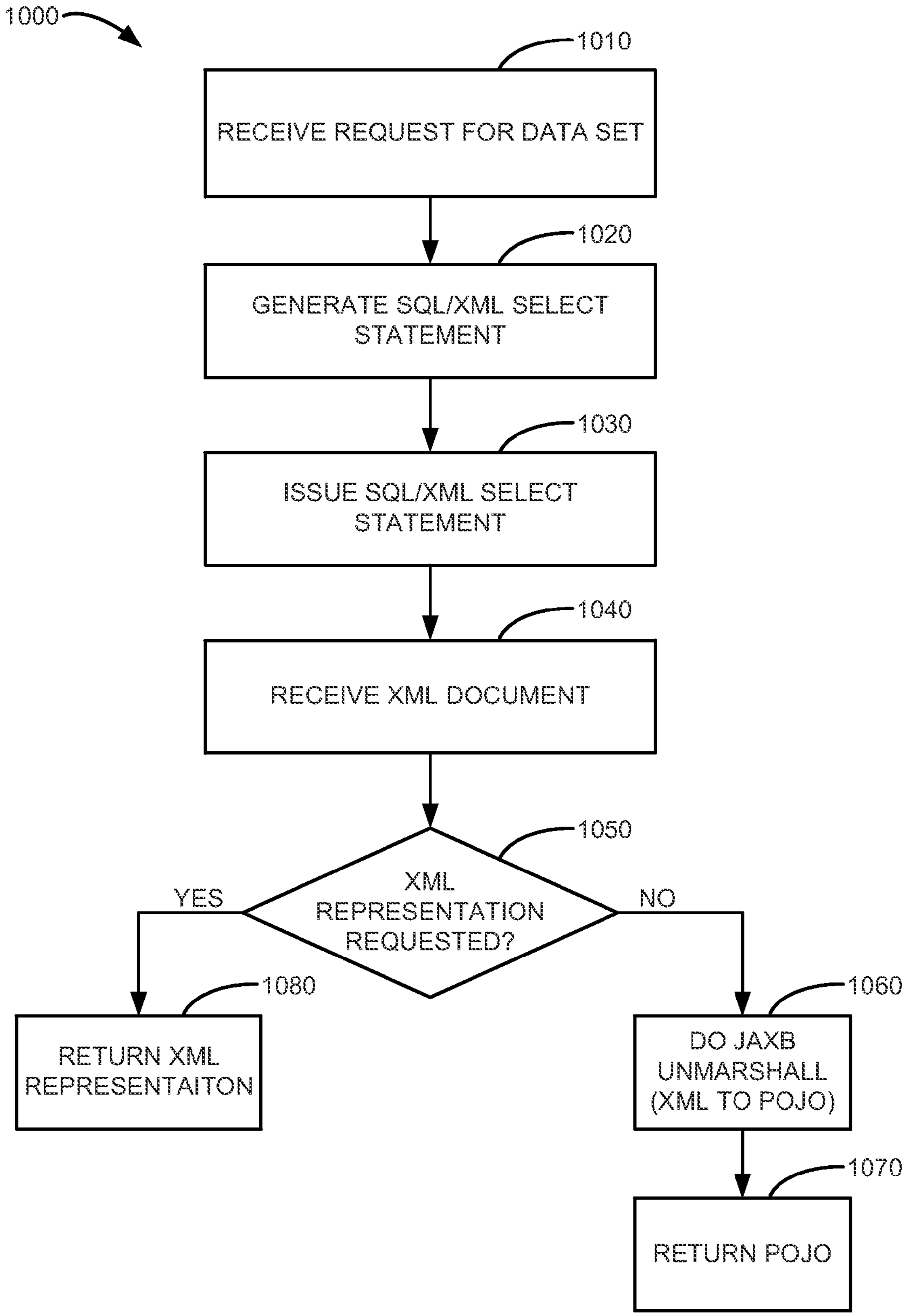
FIG. 10 is a flowchart of a process to generate a Java® object representation of a data set using an SQL/XML select request, according to an embodiment.

As a specific example of generating an object representation of a data set, FIG. 10 is a flowchart of a process to generate a Java® object representation of a data set using an SQL/XML select request, according to an embodiment. Process 1000 can be implemented as a hardware module and/or a software module. For example, process 1000 can be implemented as application-specific circuitry or as a software module including instructions stored at a memory and executed at a processor in communication with the memory. As a specific example, process 1000 can be implemented at an object mapping module.

A request for a data set is received at block 1010. For example, a request for a data set can be received via a communications interface operatively coupled to a communications link. Alternatively, for example, a request for a data set can be received via an application programming interface ("API") defined by an object mapping module. For example, the object mapping module can be a library such as a dynamically loadable library or a static library that defines software modules that implement the object mapping module and are accessible via an API.

In some embodiments, the request for the data set can include a representation selector (or selector or indicator) related to a Java® object representation or an XML representation of the data set. For example, if the request includes a value that is associated with a Java® object such as a plain old Java® object ("POJO") and a POJO will be returned to the requestor (e.g., a client of an object mapping module). If, however, the request includes a value that is associated with an XML representation of the data set, an XML document can be returned to the requestor. Alternatively, an object mapping module can include a Java® object interface and an XML document interface for requests for data sets. If a request is received via the Java® object interface, a POJO will be returned to the requestor. If a request is received via the XML document interface, an XML document will be returned to the requestor An SQL/XML select statement is generated at block 1020. The SQL/XML statement includes instructions or directives that define the format of the XML document that will be generated in response to the SQL/XML statement. In other words, the SQL/XML defines which data elements of which tables within a relational data store are requested (e.g., should be accessed) and the format (e.g., placement within an XML document and identifiers or names of the XML elements and/or attributes of that XML document) of those data elements within the requested XML document.

The SQL/XML statement can be generated or constructed in various ways. For example, a template can be used. The template can include XML statements to obtain an object representation from the relational data store is provided verbatim to the object mapping module in a configuration file. Entire SQL/XML statements or fragments of SQL/XML can be thus provided and combined as needed at runtime (e.g., when a request for a data set is received). For example, SQL application programming interfaces such as Java® Database Connectivity ("JDBC") and Open Database Connectivity ("ODBC") provide mechanisms for parameter values to be provided as placeholders in a template file that can be replaced with other values just prior to issuance or execution of the statement.

As an example of an SQL/XML select statement, FIG. 10 is a flowchart of a process to generate a Java® object representation of a data set using an SQL/XML select request, according to an embodiment. FIG. 11 illustrates an SQL/XML select statement, according to an embodiment. Syntactically, SQL/XML select statement 1100 uses the syntax of the XML extensions to SQL. Functionally, SQL/XML select statement 1100 defines the tags (or data element identifiers) of an XML document and describes which data elements of the tables within a relational data store should be associated with those tags within the XML document. More specifically, SQL/XML select statement 1100 requests data elements from a relational data store related to a purchase order and that the result of that request (i.e., a select operation within the relation data store) be returned (or provided) as an XML document having a format (or structure) described by the SQL/XML select statement.

The SQL/XML statement is then issued (or sent) to the relational data store at block 1030. Said differently, the XML representation defined in the SQL/XML statement is request at block 1030. The relational data store accesses the requested data elements within the tables to the relational data store and defines an XML document based on the SQL/XML statement and sends that XML document to the object mapping module. As an example of an XML document based on an SQL/XML select statement, FIG. 12 is a representation of an XML document based on the SQL/XML select statement of FIG. 11, according to an embodiment. In other words, XML document 1200 includes the tags defined by SQL/XML statement 1100 and data elements from a relational data store requested (or identified) by SQL/XML statement 1100.

At block 1040, the XML document (i.e., the XML representation) of the data set is received at the object mapping module. If an XML representation of the data was not requested (i.e., a Java® object was requested at block 1010) at block 1050, process 1000 proceeds to block 1050 and the XML document received at block 1040 is unmarshalled using JAXB to a POJO. In other words, a POJO is generated (or defined) from the XML document. The POJO is then returned to the requestor at block 1070. FIG. 13 is a representation of a Java® class including JAXB annotations related to the XML document of FIG. 12, according to an embodiment. In other words, Java® class 1300 includes JAXB annotations that can be used to generate a POJO from an XML document based on the JAXB framework. Said differently, the JAXB annotations of Java® class 1300 can be used by a JAXB-compliant software module to unmarshall XML document 1200 into a POJO including the values of the data element of XML document 1200.

If an XML representation of the data was requested (i.e., an XML document was requested at block 1010) at block 1050, process 1000 proceeds to block 1080 and the XML document received at block 1040 is returned (or forwarded) to the requestor at block 1080. In some embodiments, a format of the XML document can be altered before that XML document is forwarded or returned to a requestor. For example, the data elements or tags of the XML document can be specified in the SQL/XML select statement to be abbreviated or shortened and those tags can be replaced with full (e.g., unabbreviated) tags before the XML document is returned to the requestor.

Process 1000 can include blocks in addition to those illustrated in FIG. 10. Additionally, one or more blocks can be rearranged. For example, a POJO can be stored at a cache memory before or after that POJO is returned to a requestor. Moreover, the cache memory can be accessed to determine whether a POJO exists for a requested data set before that data set is requested from the relation data store. Furthermore, although process 1000 is discussed above with reference to an object mapping module, process 1000 is applicable within other environments.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java®, C++, C, an assembly language, a hardware description language, and/or another suitable programming language. For example, a processor can be a virtual machine hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple processors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java®, C++, or other object-oriented programming language and development tools. Additional examples of computer code include, but are not limited to, control signals, encrypted code, and compressed code.

Figure 14:
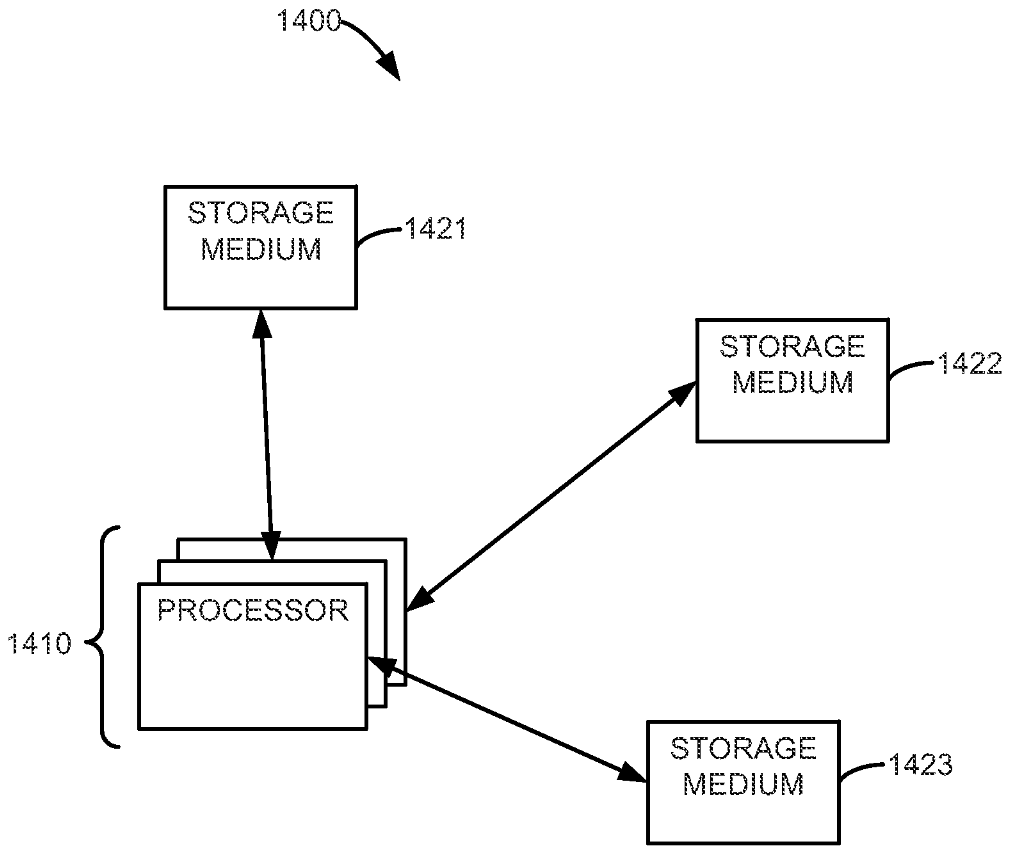
FIG. 14 is a schematic block diagram of a system including a processor and storage media, according to an embodiment.

As an example of a system including one or more processors and processor-readable storage media, FIG. 14 is a schematic block diagram of system 1400 including a processor and storage media, according to an embodiment. As illustrated in FIG. 14, system 1400 includes one or more processors 1410 operatively coupled to storage medium 1421, storage medium 1422, and storage medium 1423. One or more processors 1410 can access instructions or code at storage medium 1421, storage medium 1422, and storage medium 1423. Storage media 1421, 1422, and 1423 can be any processor-readable media and/or related devices to access processor-readable media. For example, storage medium 1421 can be a hard disk drive including a magnetic storage medium, storage medium 1422 can be an optical drive such as a DVD drive and can accept DVD storage media on which processor-readable instructions can be stored, and storage medium 1423 can be a FLASH memory drive with a Universal Serial Bus ("USB") interface. In some embodiments, storage media 1421, 1422, and/or 1423 can be local to (e.g., coupled to a common computing device) one or more processors 1410. In some embodiments, storage media 1421, 1422, and/or 1423 can be remote from (e.g., coupled to a separate computing device) one or more processors 1410 and in communication with one or more processors 1410 via communications link. Furthermore, one or more of storage media 1421, 1422, and/or 1423 can be local to one or more processors 1410 and one or more of the remaining of storage media 1421, 1422, and/or 1423 can be remote from one or more processors 1410.

As a more specific example, one or more processors 1410 can be included within a computing device having a hard disk drive represented by storage medium 1421 and a DVD drive including DVD media represented by storage medium 1422. The computing device can also include a USB host controller to communicate with a FLASH memory drive represented by storage medium 1423. One or more processors 1410 can access processor-readable instructions such as processor-readable instructions that implement an operating system, software application, and/or one or more processes at any of storage media 1421, 1422, and/or 1423. Said differently, one or more processors 1410 can interpret or execute instructions at processor-readable media via storage medium 1421, storage medium 1422, and/or storage medium 1423. In some embodiments, system 1400 can include one or more memories such as RAM that function as a cache between one or more of storage medium 1421, storage medium 1422, and/or storage medium 1423 and one or more processors 1410 for instructions or code stored (or accessible) at one or more of storage medium 1421, storage medium 1422, and/or storage medium 1423.

While certain embodiments have been shown and described above, various changes in form and details may be made. For example, some features of embodiments that have been described in relation to one application module such as a network service and/or a related process can be useful to other application modules. In other words, processes, features, and/or properties of various embodiments described in relation to one embodiment can be related to another embodiment. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. An method to access an object representation of a data set, comprising:

requesting a markup representation of the data set at a relational data store, the data set having a first portion stored at a first table structure of the relational data store and a second portion stored at a second table structure of the relational data store, wherein the data set is a markup representation of the data set in an abbreviated format, wherein the data set includes opening tags and closing tags, and wherein an element of the data set can encapsulate other elements included between an opening tag and a closing tag;

receiving from the relational data store the markup representation of the data set in the abbreviated format;

expanding the markup representation of the data set in the abbreviated format to a markup representation of the data set in an unabbreviated format; and generating the object representation of the data set based on the markup representation of the data set in the unabbreviated format, the object representation of the data set including a first element having a value of the first portion and a second element having a value of the second portion.

2. The method of claim 1, further comprising:

receiving, before the requesting, from a network service a request for the object representation of the data set; and sending the object representation of the data set to the network service.

3. The method of claim 1, wherein the data set is a first data set, the method further comprising:

receiving, before the requesting, from a first network service a first request for the object representation of the first data set;

sending the object representation of the first data set to the first network service;

receiving from a second network service a second request for a markup representation of a second data set;

requesting a markup representation of the second data set at the relational data store, the second data set having a first portion stored at the first table structure of the relational data store and the second portion stored at the second table structure of the relational data store;

receiving from the relational data store the markup representation of the second data set; and sending the markup representation of the second data set to the second network service.

4. The method of claim 1, wherein the markup representation is a first markup representation having a first format, the method further comprising:

receiving, before the requesting, a first request for the object representation of the data set;

receiving a second request for a second markup representation of the data set, the second markup representation of the data set having a second format different from the first format;

requesting the second markup representation of the data set at the relational data store; and receiving from the relational data store the second markup representation of the data set.

5. The method of claim 1, wherein the markup representation is a first markup representation having a first format, the method further comprising:

sending the object representation of the data set to a first network service;

requesting a second markup representation of the data set at the relational data store, the second markup representation of the data set having a second format different from the first format;

receiving from the relational data store the second markup representation of the data set; and sending the second markup representation of the data set to a second network service.

6. The method of claim 1, wherein the requesting includes defining a format of the markup representation of the data set.

7. The method of claim 1, wherein the generating is based on Java Architecture for XML Binding.

8. An object mapping hardware module, comprising:

a processor;

a relational data store configured to store a plurality of data sets, the relational data store having a markup interface to generate a markup representation of a data set in an abbreviated format from the plurality of data sets including a first element and a second element, a first portion of the data set from the plurality of data sets included at the first element, a second portion of the data set from the plurality of data sets included at the second element, wherein the markup representation of the data set includes opening tags and closing tags, and wherein an element of the data set can encapsulate other elements included between an opening tag and a closing tag; and the object mapping module in communication with the relational data store via the markup interface of the relational data store, the object mapping module configured to receive the markup representation of the data set in the abbreviated format from the plurality of data sets via the markup interface, the object mapping module configured to expand the mark up representation of the data set in the abbreviated format to a markup representation of the data set in an unabbreviated format as requested by an application module, the object mapping module configured to generate an object representation of the data set from the markup representation of the data set in the unabbreviated format, wherein the object representation of the data set includes the first element having a value of the first portion of the data set and the second element having a value of the second portion of the data set, the object mapping module having an object interface to provide access to the object representation of the data set from the representation of the data set in the unabbreviated format.

9. The hardware module of claim 8, wherein:

the relational data store is a Structured Query Language database;

the markup interface of the Structured Query Language database is a Structured Query Language to Extensible Markup Language interface; and the object representation of the data set from the plurality of data sets is a Java object.

10. The hardware module of claim 8, wherein:

the first portion of the data set from the plurality of data sets is stored at a first table structure of the relational data store; and the second portion of the data set from the plurality of data sets is stored at a second table structure of the relational data store.

11. The hardware module of claim 8 wherein the object mapping module has a markup interface to provide access to a markup representation of each data set from the plurality of data sets, the hardware module further comprising:

a first application module to request at the object interface of the object mapping module an object representation of a first data set from the plurality of data sets, the object mapping module configured to access the markup representation of the first data set at the relational data store via the markup interface of the relational data store and provide access to the object representation of the first data set at the object interface of the object mapping module to the first application module; and a second application module to request at the markup interface of the object mapping module a markup representation of a second data set from the plurality of data sets, the object mapping module configured to access the markup representation of the second data set at the relational data store via the markup interface of the relational data store and provide access to the markup representation of the second data set at the markup interface of the object mapping module to the second application module.

12. The hardware module of claim 8, wherein the object mapping module has a markup interface to provide access to a markup representation of each data set from the plurality of data sets, the hardware module further comprising:

a first application module to request at the object interface of the object mapping module an object representation of a first data set from the plurality of data sets, the object mapping module configured to access the markup representation of the first data set in a first format at the relational data store via the markup interface of the relational data store and provide access to the object representation of the first data set at the object interface of the object mapping module to the first application module; and a second application module to request at the markup interface of the object mapping module a markup representation of a second data set from the plurality of data sets, the object mapping module configured to access the markup representation of the second data set in a second format different from the first format at the relational data store via the markup interface of the relational data store and provide access to the markup representation of the second data set at the markup interface of the object mapping module to the second application module.

13. The hardware module of claim 8, wherein the object mapping module has a markup interface to provide access to a markup representation of each data set from the plurality of data sets, the hardware module further comprising:

a first application module to request at the object interface of the object mapping module an object representation of a first data set from the plurality of data sets, the object mapping module configured to access the markup representation of the first data set in an abbreviated format at the relational data store via the markup interface of the relational data store and provide access to the object representation of the first data set at the object interface of the object mapping module to the first application module; and a second application module to request at the markup interface of the object mapping module a markup representation of a second data set from the plurality of data sets, the object mapping module configured to access the markup representation of the second data set in an unabbreviated format at the relational data store via the markup interface of the relational data store and provide access to the markup representation of the second data set at the markup interface of the object mapping module to the second application module.

14. The hardware module of claim 8, wherein the markup interface of the relational data store is configured to generate the markup representation of each data set from the plurality of data sets in response to a single request for the markup representation of that data set from the plurality of data sets from the object mapping module.

15. A non-transitory, processor-readable medium storing code representing instructions to cause a processor to perform a process, the code comprising code to:

receive from an application module a representation selector associated with a markup representation of a data set, wherein the markup representation of the data set includes opening tags and closing tags, and wherein an element of the data set can encapsulate other elements included between an opening tag and a closing tag;

request a markup representation of the data set at a relational data store, the data set having a first portion stored at a first table structure of the relational data store and a second portion stored at a second table structure of the relational data store, wherein the data set includes opening tags and closing tags, and wherein an element of the data set can encapsulate other elements included between an opening tag and a closing tag;

receive from the relational data store a markup representation of the data set in an abbreviated format; and send in response to the representation selector a markup representation of the data set in an unabbreviated format to the application module; and generate an object representation of the data set based on the markup representation of the data set in the unabbreviated format, wherein the object representation of the data set includes a first element having a value of the first portion and a second element having a value of the second portion.

16. The processor-readable medium of claim 15, wherein the markup representation includes a compact tag value, the code further comprising code to:

replace, before the sending, the compact tag value with an expanded tag value.

17. The processor-readable medium of claim 15, wherein the representation selector is a first representation selector and the data set is a first data set, the code further comprising code to:

receive a second representation selector associated with an object representation of a second data set;

request a markup representation of the second data set at the relational data store, the second data set having a first portion stored at a third table structure of the relational data store and a second portion stored at a fourth table structure of the relational data store;

receive from the relational data store the markup representation of the second data set; and generate the object representation of the second data set in response to the second representation selector.

18. The processor-readable medium of claim 15, wherein the requesting includes defining a format of the markup representation of the data set.

19. The processor-readable medium of claim 15, wherein the representation selector is associated with a markup interface of an object mapping module.

20. The processor-readable medium of claim 15, wherein the representation selector is a first representation selector, the data set is a first data set, and the requesting includes defining an expanded format of the markup representation of the data set, the code further comprising code to:

receive a second representation selector associated with an object representation of a second data set;

request a markup representation of the second data set in a compact format at the relational data store, the second data set having a first portion stored at a third table structure of the relational data store and a second portion stored at a fourth table structure of the relational data store;

receive from the relational data store the markup representation of the second data set; and generate the object representation of the second data set in response to the second representation selector.

* * * * *